(12) United States Patent
Brown et al.

(10) Patent No.: US 7,873,737 B2
(45) Date of Patent: *Jan. 18, 2011

(54) METHOD AND SYSTEM FOR RESTRICTING ACCESS TO USER RESOURCES

(75) Inventors: Ralph William Brown, Boulder, CO (US); Milo S. Medin, Sunnyvale, CA (US); Robert Keller, Menlo Park, CA (US); David Temkin, San Francisco, CA (US)

(73) Assignee: At Home Bondholders' Liquidating Trust, New York, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/166,088

(22) Filed: Jul. 1, 2008

(65) Prior Publication Data

US 2008/0271159 A1    Oct. 30, 2008

Related U.S. Application Data

(63) Continuation of application No. 10/836,544, filed on Apr. 30, 2004, now Pat. No. 7,406,530, which is a continuation of application No. 09/427,778, filed on Oct. 26, 1999, now Pat. No. 6,732,179, and a continuation-in-part of application No. 08/811,586, filed on Mar. 5, 1997, now Pat. No. 6,370,571.

(51) Int. Cl.
*G06F 15/16* (2006.01)
*G06F 15/173* (2006.01)
*H04N 7/173* (2006.01)

(52) U.S. Cl. ............... 709/229; 709/225; 719/328; 725/2; 725/110; 725/118; 726/1

(58) Field of Classification Search ............ 709/225, 709/229; 713/201, 328; 725/2, 110, 118; 726/1; 719/328

See application file for complete search history.

(56) References Cited

U.S. PATENT DOCUMENTS 6,678,733 B1 * 1/2004 Brown et al. ............ 709/229

(Continued)

*Primary Examiner*—George C Neurauter, Jr.
(74) *Attorney, Agent, or Firm*—Fenwick & West LLP

(57) ABSTRACT

A user's set top box (STB), or other client, executes a shell and has an application program interface (API) by which certain features of the client can be controlled. The client is in communication with a walled garden proxy server (WGPS), which controls access to a walled garden. The walled garden contains links to one or more servers providing network-based services. The client sends a request to the WGPS to access a service provided by a site in the garden. To provide the service, the site sends the client a message containing code calling a function in the API. The WGPS traps the message from the site and looks up the site in a table to determine the access control list (ACL) for the site. The ACL is a bit-map that specifies which functions of the client's API can be invoked by code from the site. The WGPS includes the ACL in the header of the hypertext transport protocol (HTTP) message to the client. The shell receives the message and extracts the ACL. The shell uses the ACL to determine whether the code has permission to execute any called functions in the API. If the code lacks permission, the shell stops execution and sends a message to the site indicating that the site lacks permission. Otherwise, the shell allows the code to call the function.

16 Claims, 5 Drawing Sheets

U.S. PATENT DOCUMENTS

| | | | |
|---|---|---|---|
| 6,732,179 B1 * | 5/2004 | Brown et al. | 709/229 |
| 7,225,275 B2 * | 5/2007 | Medin | 709/249 |
| 7,406,530 B2 * | 7/2008 | Brown et al. | 709/229 |
| 7,529,856 B2 * | 5/2009 | Medin | 709/249 |
| 2004/0205339 A1 * | 10/2004 | Medin | 713/163 |
| 2004/0210633 A1 * | 10/2004 | Brown et al. | 709/203 |
| 2007/0183441 A1 * | 8/2007 | Medin | 370/429 |

* cited by examiner

METHOD AND SYSTEM FOR RESTRICTING ACCESS TO USER RESOURCES

CROSS-REFERENCE TO RELATED APPLICATIONS

This application is a continuation of U.S. patent application Ser. No. 10/836,544 filed on Apr. 30, 2004, which is a continuation of U.S. Pat. No. 6,732,179 filed on Oct. 26, 1999, which is a continuation-in-part of U.S. Pat. No. 6,370,571 filed on Mar. 5, 1997; and is related to U.S. Pat. No. 6,678,733, filed on Oct. 26, 1999, the entire contents of each being hereby incorporated by reference herein.

BACKGROUND

1. Field of the Invention

This invention pertains in general to high-speed data networks and in particular to a system and method for restricting access by servers on the network to resources available on user computer systems.

2. Background of the Invention

Cable television service is usually sold as a subscription to one or more "tiers" of channels. Typically, a basic cable subscription allows access to a small tier of channels and is sold for a relatively low subscription fee. The subscriber can purchase additional tiers of cable channels for additional fees.

In most cable systems, the subscriber uses a "set-top box" (STB) to access the cable channels. The STB contains a microprocessor and other hardware for tuning and descrambling channels in the tiers to which the subscriber has access. The STB may also enable other services, such as pay-per-view or digital music reception in return for additional fees.

In recent years, the STB has incorporated a cable modem that enables access to Internet- and World Wide Web-("the web") based resources via the cable infrastructure. A cable modem typically has at least one assigned Internet Protocol (IP) address and is managed by an Internet Service Provider (ISP). The ISP inserts and extracts Internet traffic to and from the cable infrastructure and distributes it to the cable modem having the given IP address or the Internet, as appropriate.

U.S. Pat. No. 6,678,733 discloses a walled garden accessible to STB users who are customers of the ISP. Application servers within the walled garden provide services to the users, including, for example, access to electronic content, access to electronic commerce services, and any other functionality that can be provided electronically via a network. The users can subscribe to one or more of the services in the walled garden either individually or as part of a tier. U.S. Pat. No. 6,678,733 discloses a way to restrict users to only those services in the walled garden to which the users are entitled to access.

The walled garden application servers may desire or need to access features of the users' STBs in order to provide certain services. For example, an application server may need to generate text or controls on a user's television display, change the channel to which the STB is tuned, print a receipt on a printer coupled to the STB, or complete a fee transaction using an electronic wallet stored in the STB.

The ISP would prefer to limit the features on the users' STBs to which the application servers have access, typically to generate revenue and enhance security. For example, the ISP may desire to charge a fee for letting an application server change the channel to which the user's STB is tuned or conduct an electronic commerce transaction using the electronic wallet. Likewise, the ISP would like to limit the abilities of the application server to ensure that a misbehaving or compromised application server cannot act maliciously toward a user's STB.

Accordingly, there is a need for a way to restrict the features of a user's STB that can be accessed and utilized by an application server within the walled garden. Preferably, the solution to this need will restrict the features at a fine grain, thereby allowing an application server to access only those features which are necessary to provide the service sought by the user.

SUMMARY OF THE INVENTION

The above needs are met by a method and system that passes an access control list (ACL) to the set top box (STB), or other form of client, indicating which functions in the client can be called by a walled garden site. A client is coupled to a television set, computer system, or other device having a display. The client preferably contains a central processing unit, a memory, a television tuner, and a cable modem. The client also preferably contains a video subsystem for generating images on the display and an input for accepting commands from the user.

The client preferably executes software supporting standard web browsing functionality. In one embodiment, the client executes the Windows CE operating system. Programs executing on the operating system include a hypertext markup language (HTML) rendering engine, a JAVA virtual machine for executing JAVA programs, and other controls supporting web browsing functionality. A shell program also preferably executes on the operating system and generates a user interface on the display. The shell program controls access to sets of application program interfaces (APIs) for providing functionality at the client. For example, the APIs include functions allowing a program to change the channel, access an electronic program guide held by the client, instantiate user interface (UI) elements, and access an electronic walled held by the client.

The cable modem is preferably coupled to a coaxial cable and supports bi-directional broadband communications using the Internet protocol (IP). The coaxial cable is typically aggregated with other cables into a fiber-optic cable. The fiber-optic cable, in turn, is coupled to a cable modem termination server (CMTS) at a headend. The CMTS contains hardware for terminating the IP data channel, including IP switches, routers, and high-availability servers.

The CMTS allows the client to access a private network containing a walled garden proxy server (WGPS) via the hypertext transport protocol (HTTP). The WGPS controls access to a walled garden of network-based services. The services available in the walled garden may include, for example, access to electronic content, access to electronic commerce services, and any other functionality that can be provided electronically via a network. These services are provided by one or more walled garden servers coupled to a walled garden network. The walled garden servers may include servers directly coupled to the walled garden network, servers having direct connections to remote application databases, servers coupled to the walled garden network via a virtual private network, and servers having only a frontend on the walled garden network. Each site on a walled garden server is identified by a plot number.

A site held on a server within the walled garden may respond to a user by sending a message containing a JAVASCRIPT program to the client. The program can invoke one or more of the functions in the APIs. The WGPS traps messages from the site and determines the ACL for the site. The ACL is preferably a bit-map that specifies which STB API functions may be called by the site. The WGPS passes the ACL to the client as a header to the message from the site. In addition, the WGPS examines the header received from the site to protect against ACL masquerading or spoofing by the site.

The shell executing on the client extracts the ACL from the header when it receives the message. The shell uses the bit-map to determine which API functions can be invoked by the walled garden site. If the JAVASCRIPT program tries to invoke a function for which it lacks permission, the client halts execution of the program and sends a message back to the site indicating that the invocation failed because the site lacks permission. Otherwise, the client allows the JAVASCRIPT program invoke the function and returns the result to the site. Thus, the walled garden site can use the APIs to provide services to the user.

DETAILED DESCRIPTION OF THE PREFERRED EMBODIMENTS

Figure 1:
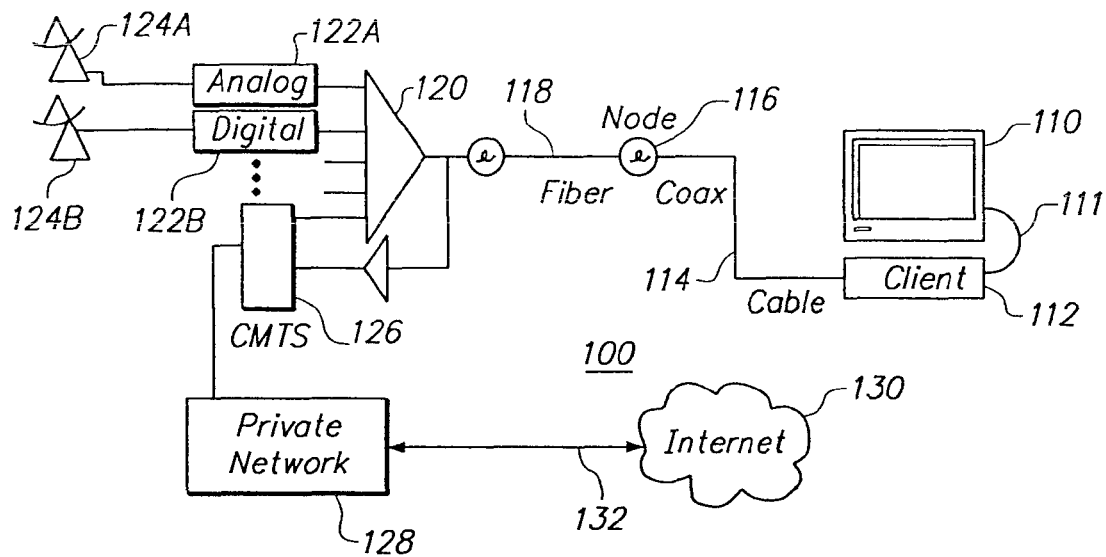
FIG. 1 is a block diagram illustrating a high-level view of a network architecture according to a preferred embodiment of the present invention.

FIG. 1 is a block diagram illustrating a high-level view of the network architecture 100 according to a preferred embodiment of the present invention. A television (TV) 110 is coupled via a data link 111 to a client 112, which is preferably a set top box (STB). The TV 110 can be any form of television, including a conventional analog TV or a high-definition (HD) digital TV. In addition, the TV 110 may be a monitor coupled to the client 112 directly. Alternatively, the client 112 may be coupled to a computer system instead of a TV 110. The data link 111 may be, for example, a serial link, a radio frequency (RF) link, a broadband link, a standard monitor cable, or an S-video link. The client 112 can also be integrated into the TV or computer system.

Typically, the client 112 is an STB and is purchased or leased by a person or household who also subscribes to the cable TV and data communication services. The person or persons who performs this task is often referred to as the "subscriber." Because multiple people may use a single client 112, the person using the client in this description is referred to as a "user." The STB 112 or other device that the user uses to access data communication services is generically referred to as a "client." The distinction between actions performed by the user and client are often blurred, especially when the client performs an action, such as fetching a web page, on behalf of a user. Accordingly, the terms "user" and "client" are often interchangeable in this description.

The client 112 preferably includes at least one tuner for tuning a TV signal and a cable modem for receiving and transmitting data. In addition, the client 112 is preferably coupled to a coaxial cable 114 carrying analog and/or digital TV signals and providing two-way data communication between the client 112 and the rest of the network using the Internet protocol (IP). In alternative embodiments, data communication between the client 112 and the rest of the network may be provided by other forms of communication technologies, including analog modem, digital subscriber line (DSL), and wireless technologies. These alternative technologies may or may not carry TV or other video signals with the data.

In the embodiment where the client 112 is coupled to a coaxial cable, the coaxial cable 114 is aggregated with other cables at a node 116, typically from geographically proximate locations, into a fiber-optic cable 118. The fiber-optic cable 118, in turn, is aggregated with other fiber-optic cables at a headend 120.

The headend 120 integrates signals from multiple sources into the fiber-optic cable 118. In one embodiment, the headend 120 receives analog 122A and digital 122B television signals via analog 124A and digital 124B satellite downlinks, respectively. In addition, the headend 120 includes a cable modem termination server (CMTS) 126 for terminating the IP data channel, including IP switches, routers, and high-availability servers.

The CMTS 126 is preferably coupled to a private network 128 maintained by an Internet service provider (ISP) or other organization. In a preferred embodiment of the present invention, the private network 128 includes the high-speed network architecture described in U.S. patent application Ser. No. 08/811,586, entitled SYSTEM AND METHOD FOR DELIVERING HIGH-PERFORMANCE ONLINE MULTIMEDIA SERVICES, filed on Mar. 5, 1997 by Milo S. Medin, which is hereby incorporated by reference herein. In general, the private network 128 provides network access to the users by managing a cable modem contained within the client 112. A widely accepted standard for cable modems is the Multimedia Cable Network System (MCNS) Data-Over-Cable Service Interface Specifications (DOCSIS). The private network 128 also provides connectivity to servers providing services to the clients, such as caching, account and billing management, electronic commerce, information databases, and any other functionality that can be achieved via a network. Typically, the resources on the private network 128 can be accessed by only subscribers of the ISP.

In the illustrated embodiment, the private network 128 is in communication with the Internet 130 via a network link 132. For security purposes, a preferred embodiment of the present invention restricts the ability of the client 112 to download software from the Internet 130. However, other embodiments may provide the client 112 with full access to the Internet 130 or restrict the client to only the resources available in the private network 128.

Figure 2:
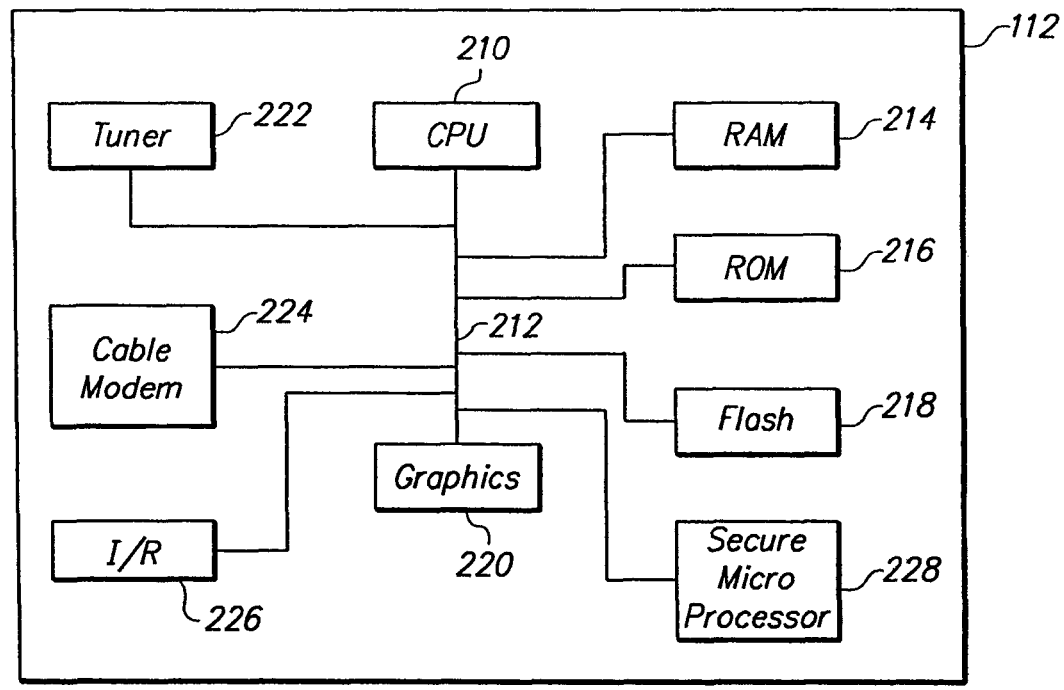
FIG. 2 is a high-level block diagram of a client according to an embodiment of the present invention.

FIG. 2 is a high-level block diagram of a client 112 according to an embodiment of the present invention. Preferably, the client 112 is an STB and supports both broadcast services including video, audio, and data, and IP-based services including e-mail, web browsing, IP multicast, and streaming video and audio. In a preferred embodiment of the present invention, the client 112 is a GENERAL INSTRUMENTS DCT-5000, although any STB, computer system, or modem providing equivalent functionality can be substituted. The client 112 preferably includes components typically found in a computer system including a central processing unit (CPU) 210. The CPU 210 can be any type of general or specific purpose processor and processes instructions and data for providing the functionality described herein. The CPU 210 is coupled via a bus 212 to a random access memory (RAM) 214, a read only memory (ROM) 216, and non-volatile memory 218, such as flash memory. The RAM 214 is preferably synchronous dynamic RAM (SDRAM) and stores programs and data used by the CPU 210 as is well known in the art. Similarly, the ROM 216 and flash memory 218 store instructions and data used to maintain the system operation and configuration.

The bus 212 also couples the CPU 210 with a graphics and video subsystem 220 which generates text and video images on the TV 110. In addition to providing conventional TV images, the graphics and video subsystem 220 preferably generates a user interface (UI) by which the user can access the features and services provided by the client 112. The graphics and video subsystem 220 may also support advanced features such as 3-D graphics, video decoding, and video digitizing.

TV and cable modem tuners 222, 224 are also preferably coupled to the bus 212. The TV tuner 222 is preferably a frequency-agile tuner dedicated to analog and digital broadcast services. The cable modem tuner 224 is preferably a frequency-agile tuner dedicated to cable modem services. Although not shown in FIG. 2, the client 112 may also include other tuners for handling an out-of-band data channel and a return signal path. The tuners 222, 224 receive the signal from the coaxial cable 114.

An infrared (IR) transceiver 226 is also preferably coupled to the bus 212. The transceiver 226 can communicate with a wireless remote control or keyboard, thereby allowing a user to access the features of the client 112 either directly or via on-screen menus. The client 112 also preferably includes a secure microprocessor 228 for supporting secure transactions as described below. The secure microprocessor 228 holds a unique identification value for the client 112 called the "Box ID," a private/public key pair, and other information that can be used to authorize and authenticate messages to and from the client 112. In alternative embodiments, the client 112 may also include an audio accelerator for performing audio processing, an input/output (I/O) controller for communicating with external devices such as storage devices and hard copy output devices, and/or a network adapter for communicating with a local-area network.

Figure 3:
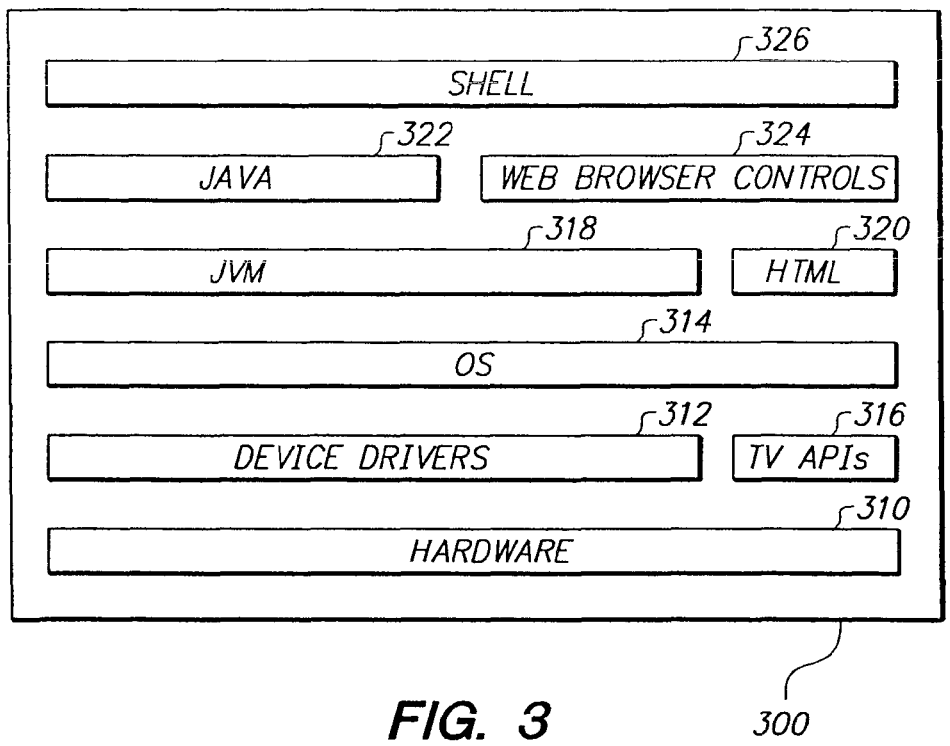
FIG. 3 is a block diagram illustrating the various levels of software and hardware executing on the client illustrated in FIG. 2.

FIG. 3 is a block diagram illustrating the various levels of client software program modules and hardware executing on the client 112 illustrated in FIG. 2. At the lowest level is the hardware 310 for executing the software and performing the basic functions supported by the client 112. Device drivers 312 for the various hardware elements sit between the operating system (OS) 314 and the hardware 310. In one embodiment, the OS 314 is a version of the WINDOWS CE operating system from MICROSOFT CORPORATION of Redmond, Wash. However, other OS's may also be used. The OS 314 controls the operation of the client 112 and makes the features of the client available to other programs executing on the client 112. The OS 314 uses the device drivers 312 to communicate with the hardware 310. In addition, a TV application program interface (API) 316 also sits between the OS 314 and the hardware 310. The OS 313 uses the TV API 316 to access dedicated TV functionality within the hardware 310.

A JAVA virtual machine (JVM) 318 and hypertext markup language (HTML) rendering engine 320 preferably execute on the OS 314. The JVM 318 functions as a virtual machine and provides an execution space for JAVA programs 322. The JAVA programs 322 may be stored locally on the client 112 or downloaded from the private network 128 or the Internet 130. In addition, the JAVA programs 322 may utilize JAVA classes dedicated to supporting the TV and media functions available on the client 112. Similarly, the HTML rendering engine 320 supports traditional web browsing functionality. A user can use the web browser controls 324 to navigate through hypertext documents as is well known in the art.

In a preferred embodiment of the present invention, a shell program 326 executes at the highest level. The shell program 326 may be implemented using, for example, native code, JAVA, JAVASCRIPT, ActiveX controls, HTML, and/or dynamic link libraries (DLLs). The shell program 326 is the controlling application and provides the user interface (UI) on the TV 110 and application support for channel navigation, an electronic program guide, storing user preferences, email, and walled garden 420 access.

Preferably, the shell program 326 contains a set of foundation layer APIs 328 that can be called by programs downloaded via the private network 128. In one embodiment, the functions in the APIs are accessed by JAVASCRIPT code downloaded to the client 112 via HTTP. All functions available through the APIs are subject to access control and a program making use of the APIs must be authorized to access the functions. If a program calls a function for which it is not authorized, the client 112 returns a FAIL_FUNCTION_NOT_AUTHORIZED error status message to the program. This status message indicates to the program that the server that supplied the program is not authorized to perform that function on the client 112.

Exemplary sets of APIs are described in the Appendix. As described therein, the APIs allow a program to change the television channel to which the client 112 is tuned, inquire about the details of a channel line-up, access an electronic program guide (EPG) stored by the client, instantiate UI elements on the television 110, retrieve information about viewer (i.e., user) accounts, access electronic wallet (E-wallet) functionality in the client to conduct electronic commerce transactions, set reminders for display on the television 110, and print pages on a printer (not shown) coupled to the client. Additional APIs may allow controlling scaling of the broadcast video picture on the television 110 and accessing settings stored by the client 112, including user preferences, bookmarks, parental controls, and diagnostics. Other APIs can easily be added to the shell 326 to provide functionality desired by the ISP, server, or users. Preferably, each function in the APIs is named, numbered, or otherwise uniquely identified. Likewise, groups of functions, related or otherwise, may also be named, numbered, or otherwise identified.

Figure 4:
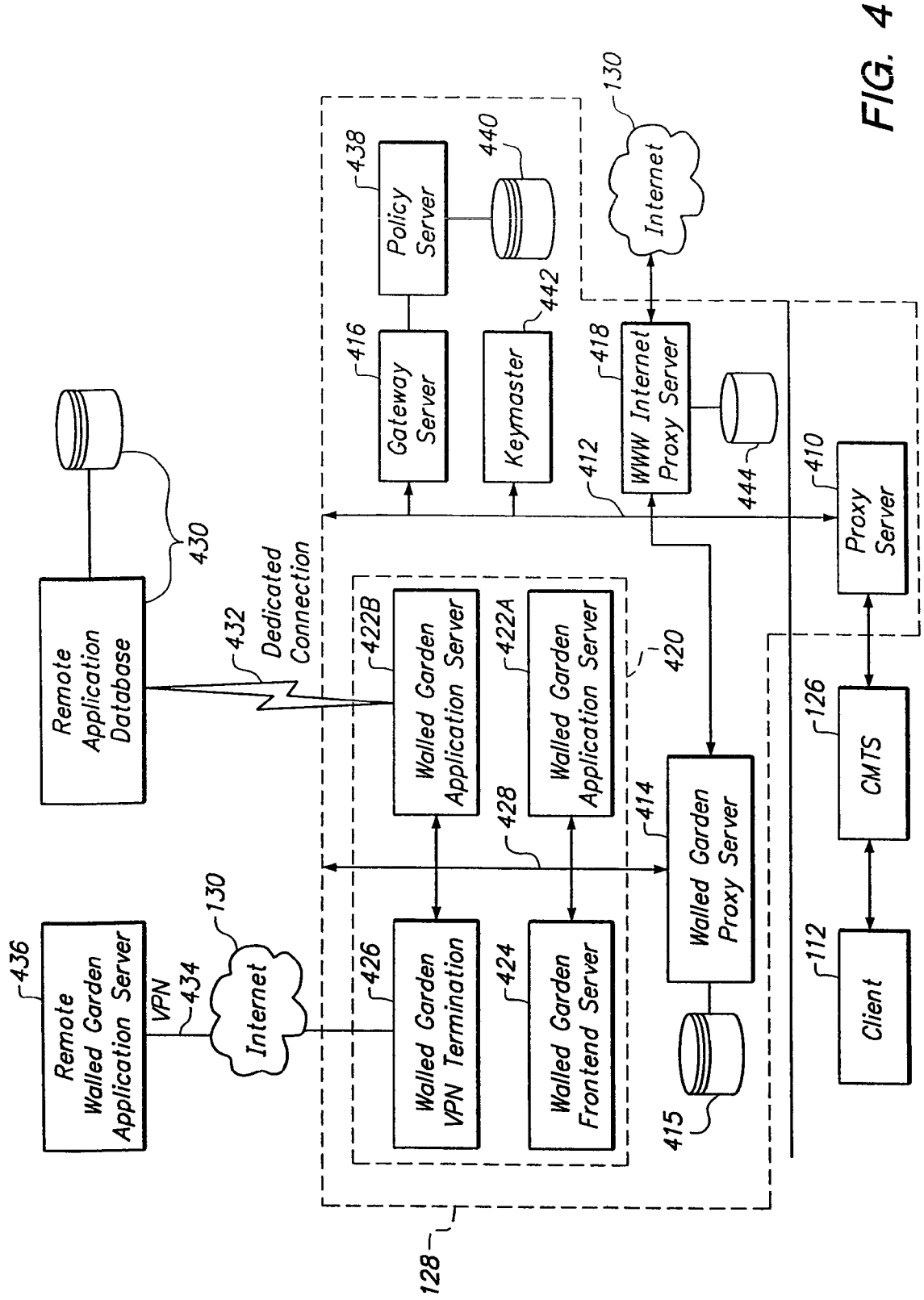
FIG. 4 is a high-level logical block diagram illustrating the client, a private network, the Internet, and other related entities.

FIG. 4 is a high-level logical block diagram illustrating the client 112, the private network 128, the Internet 130, and other related entities. As shown in FIG. 4, the CMTS 126 is preferably coupled to a proxy server 410. The proxy server 410 provides caching of web pages and other data for the clients served by the CMTS 126. The proxy server 410 is connected to a network backbone 412. A walled garden proxy server (WGPS) 414, gateway server (GS) 416, and WWW Internet proxy server 418 (Internet server) are also coupled to the network backbone 412.

Preferably, the client 112 communicates with the servers on the network 412 using standard communications protocols including the IP, hypertext transport protocol (HTTP), and secure sockets layer (SSL). Communications between the client 112 and the various servers often takes the form of hypertext markup language (HTML) documents, extensible markup language (XML) documents, JAVASCRIPT programs, and data provided through forms. Servers and data on the network 412 are preferably identified with uniform resource locators (URLs).

Each user of the client 112 preferably has a unique identification. A user can log into the client 112 by inputting the user's identity and a personal identification number (PIN) or other form of password. This user information is preferably stored in a local database held in, for example, the non-volatile memory 218 or a storage device. The database has a record for each user of the client 112 and associates the record with the user's login information. The client 112 can provide the user's login information to other servers in the network 128 when necessary to authenticate the user. For security, the user records stored in the client 112 are opaque and cannot be viewed without the login information of the particular user. When a user logs into the client 112, the login preferably remains valid until the user explicitly logs out or the client 112 is turned off. If no user has logged into the client 112, one embodiment of the present invention uses a default user profile. The rights and privileges of the default user profile can be set by the ISP.

The WGPS 414 is the entry point for the walled garden 420. Although FIG. 4 illustrates only a single walled garden 420, an embodiment of the present invention can have multiple walled gardens controlled by a single WGPS or by multiple WGPS'. Each walled garden may be controlled by a different multiple systems operator (MSO) (e.g., a different cable television company).

The illustrated walled garden 420 includes one or more servers which, in turn, hold one or more sites for providing network-based services to the users. The services may include, for example, access to electronic content such as channel guides, magazines, newspapers, stock prices, music, or video, access to electronic commerce services such as stock trading and buying and selling goods, access to a time-based or metered service, and any other functionality that can be provided electronically via a network. Preferably, the services are implemented using a combination of JAVA, XML, HTML, and/or JAVASCRIPT. The servers may be maintained by the MSO, ISP, or by other organizations who have formed business relationships with the party managing the walled garden 420. In one embodiment, the services in the walled garden 420 are arranged into sets of tiers. Preferably, the user can subscribe to one or more of the services in the walled garden 420 either individually or as part of a tier.

The WGPS 414 has an associated database 415 for holding permissions available to the user and the walled garden sites. To access the walled garden 420, the client must present a "ticket" to the WGPS 414 specifying the walled garden 420 and services to which the user has access. Alternatively, the ticket may specify only those services which the user does not have access. The database 415 identifies "poisoned" tickets, i.e., those tickets that are no longer accepted and holds keys for decrypting encrypted tickets. The database also holds information identifying the MSO or MSOs who's customers have access to the walled garden 420 in order to ensure that the ticket is affiliated with the particular walled garden. The WGPS 414 uses the ticket and the information in the database 415 to authenticate the user and authorize the user to access the services in the walled garden 420.

The database 415 also identifies the rights of walled garden sites to access the APIs in the clients 112. Preferably, the database 415 stores a Walled Garden Permissions Table that specifies the API access rights of each server or site in the walled garden. In one embodiment of the present invention, the permissions table is as follows:

| Walled Garden Permissions Table | | | |
|---|---|---|---|
| RL Prefix | User Agent | WG ACL | Affiliation |
| http:// . . . | DCT-5000 | 010111 | 0110 |
| http:// . . . | DCT-5000 | 010101 | 0100 |
| http:// . . . | DCT-5000 | 011101 | 0001 |
| . . . | . . . | . . . | . . . |
| http:// . . . | DCT-5000 | 110101 | 1000 |

The permissions table is preferably indexed by URL prefix. The URL Prefix field preferably holds a URL string long enough to uniquely identify the walled garden site having the associated permissions. For example, the URLs "http://disney.com/company/index.html" and "http://disney.com/company/about/index.html" will both match a table entry with the URL prefix "http://disney.com/company/." This technique allows different permissions to be assigned to different subtrees of a site's content.

The User Agent field preferably holds a string identifying the type of browser used by the user. For example, the User Agent field may indicate that the user is using a DCT-5000 STB. Alternatively, the field may indicate that the user is using NETSCAPE NAVIGATOR, MICROSOFT INTERNET EXPLORER, or any other type of browser. Since different user agents may have different API sets and capabilities, sites in the walled garden may have separate permissions table entries for each type of user agent. The client 112 identifies the user agent when it sends a HTTP request to the WGPS 414.

The Walled Garden Access Control List (WG ACL) field preferably contains a bit-map, or ACL, indicating to which client APIs the walled garden sites having the given URL prefix can access. The mapping from bit position to API function is arbitrary and extensible. A value of zero preferably means the site does not have permission to invoke the corresponding API function or functions, and a value of one preferably means the site does have permission to invoke the corresponding API function or functions. The Affiliation field identifies the particular walled garden 420 or MSO to which the ACL pertains.

The exemplary walled garden 420 illustrated in FIG. 4 contains two walled garden application servers (WGAS's) 422A-B, a walled garden front end server (WGFS) 424, and a walled garden virtual private network (VPN) termination point 426 (WGVPNTP) interconnected by a walled garden network (WGN) 428. The WGN 428 is preferably a closed network and essentially performs as a local area network coupling the various types of walled garden servers with the WGPS 414. A WGAS 422 is preferably a web server or some other form of server that provides web-like functionality to a user. A WGAS 422A may contain all of the hardware and storage necessary to provide a service to a user. Alternatively, the WGAS 422B may be coupled to a remote application database 430 via a dedicated network connection 432. This latter embodiment may be preferred, for example, when the WGAS 422B acts as an interface to a large database of information and the entity managing the WGAS 422B does not wish to replicate the contents of the database within the walled garden 420.

The WGFS 424 provides a frontend interface for backend servers located elsewhere on the Internet 130 or otherwise in communication with WGFS 424. For example, a WGFS 424 may be used when a large organization wishing to have a presence in the walled garden 420 leases server space from the ISP or other entity managing the walled garden. The WGFS 424 provides an access point in the walled garden 420 through which the clients can access the backend servers.

The WGVPNTP 426 allows an organization to maintain a presence in the walled garden 420 using remote servers. The ISP or other entity managing the walled garden 420 establishes a VPN 434 over the Internet 130 connecting the WGVPNTP 426 with a remote WGAS 436. The remote WGAS 436 communicates through the WGVPNTP 426 to perform the same functions as a local WGAS 422.

Each unique service within the walled garden 420 is preferably identified by a unique "plot number." The client 112 preferably identifies a specific walled garden service with the URL "http://wg/<plot_number>/ . . . " The plot number is preferably used as an index into the ticket and identifies a value specifying whether the user has access to the service. A walled garden service is typically implemented on a single server. However, a single server can support multiple walled garden services. Accordingly, a server may be identified by more than one plot number, with each plot number mapping to a different site residing on the server. A single service can also reside on multiple servers, such as when load balancing is being employed. In this case, a single plot number may resolve to more than one server.

The GS 416 controls access to a policy server (PS) 438. The GS 416 preferably receives communications from the client 112 in the form of XML and/or forms via HTTP over SSL and translates the communications into database transactions using protocols such as lightweight directory access protocol (LDAP), SQL, and open database connectivity (ODBC). The GS 416 passes the transactions to the PS 438 and the PS 438 accesses a database 440 of user authorization and authentication information in response. The database contains a list of users, walled gardens, and services in particular walled gardens 420 available to the users. The database 440 does not need to be centralized and, in one embodiment, is distributed on a regional basis. The GS 416 communicates with the PS 438 to authenticate a user's identity and issue the client a ticket specifying the walled gardens and services that the user can access. The GS 416 preferably encrypts the ticket using a secret key shared with the WGPS 424 in order to limit potential attacks on the ticket by the user. The user's client 112 stores the ticket and presents it to the WGPS 414 when seeking to access a walled garden 420.

The Internet server 418 is essentially the same as the WGPS 414, except that the Internet server 418 controls access to the Internet 130 at large rather than to the walled garden 420. In a preferred embodiment, the Internet server 418 has a database 444 for holding permissions indicating web sites that users can access and client API functions that the web sites can access. A client accesses the Internet 130 by presenting a ticket to the Internet server 418 specifying the Internet sites to which the user has access. In one embodiment, the ticket specifies the URLs using regular expression pattern matching. The database 444 also identifies poisoned tickets.

The keymaster 442 provides encryption keys to the GS 416, WGPS 414, and Internet Server 418. Preferably, the keymaster 442 has SSL links, or some other form of secure communication links, to the servers 414, 416, 418. The keymaster 442 generates pseudo-random encryption keys and securely passes the keys to the servers 414, 416, 418. The servers 414, 416, 418 use the keys to encrypt and decrypt the tickets. In a preferred embodiment, the servers 414, 416, 418 use symmetric encryption and use the same key to encrypt and decrypt tickets, although other encryption systems can be used. Each key is valid for a predetermined time period. The keymaster 442 issues a new key to the servers 414, 416, 418 at the expiration of the previous key. Each key is preferably indexed so that the keys can be individually identified.

The entities illustrated in FIG. 4 are not necessarily physically separate or executing on dedicated computer systems. For example, the walled garden network and the network connecting the various servers may actually be a single network that is logically divided into separate networks. Moreover, the various servers, such as the WGPS 414, GS 416, and PS 438, may actually be integrated into the proxy server 410 or another computer system. Likewise, the various databases 415, 440 may be implemented on a single database. Conversely, the functionality ascribed to a single network, server, or database in the description of FIG. 4 may actually be performed by multiple networks, servers, and/or databases, respectively. Thus, FIG. 4 illustrates logical entities and logical interconnections between the entities according to a preferred embodiment of the present invention. However, alternative embodiments of the present invention may have different physical structures.

Figure 5:
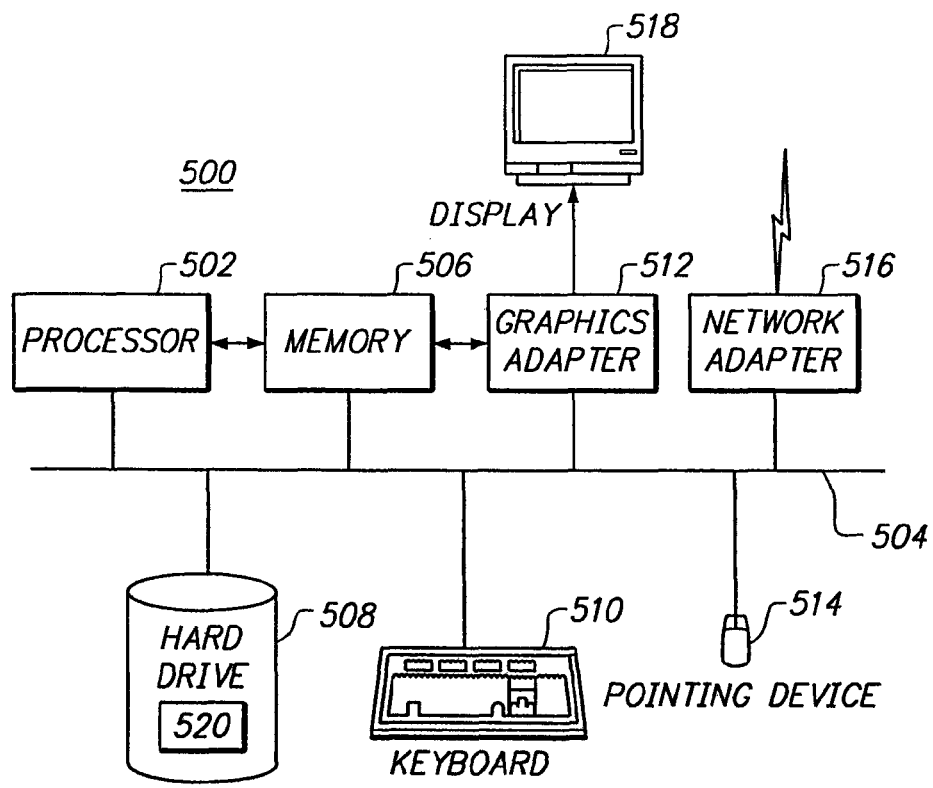
FIG. 5 is a high-level block diagram of a computer system for performing as one of the servers illustrated in FIG. 4, such as the walled garden proxy server (WGPS) and/or the gateway server (GS)

FIG. 5 is a high-level block diagram of a computer system 500 for performing as one or more of the servers, such as the WGPS 414 and/or the PS 428, illustrated in FIG. 4. Illustrated are at least one processor 502 coupled to a bus 504. Also coupled to the bus 504 are a memory 506, a storage device 508, a keyboard 510, a graphics adapter 512, a pointing device 514, and a network adapter 516. A display 518 is coupled to the graphics adapter 512.

The at least one processor 502 may be any general-purpose processor such as an INTEL x86 compatible- or SUN MICROSYSTEMS SPARC compatible-central processing unit (CPU). The storage device 508 may be any device capable of holding large amounts of data, like a hard drive, compact disk read-only memory (CD-ROM), DVD, or some form of removable storage device. The memory 506 holds instructions and data used by the processor 502. The pointing device 514 may be a mouse, track ball, light pen, touch-sensitive display, or other type of pointing device and is used in combination with the keyboard 510 to input data into the computer system 500. The graphics adapter 512 displays images and other information on the display 518. The network adapter 516 couples the computer system 500 to a local or wide area network.

Program modules 520 for performing the functionality of the server, according to one embodiment of the present invention, are stored on the storage device 508, loaded into the memory 506, and executed by the processor 502. Alternatively, hardware or software modules may be stored elsewhere within the computer system 500. In one embodiment of the present invention, one or more of the illustrated servers are implemented using redundant hardware to create a high-availability computer system. As is known in the art, an advantage of a high-availability computer system is a reduced risk of system failure.

Figure 6:
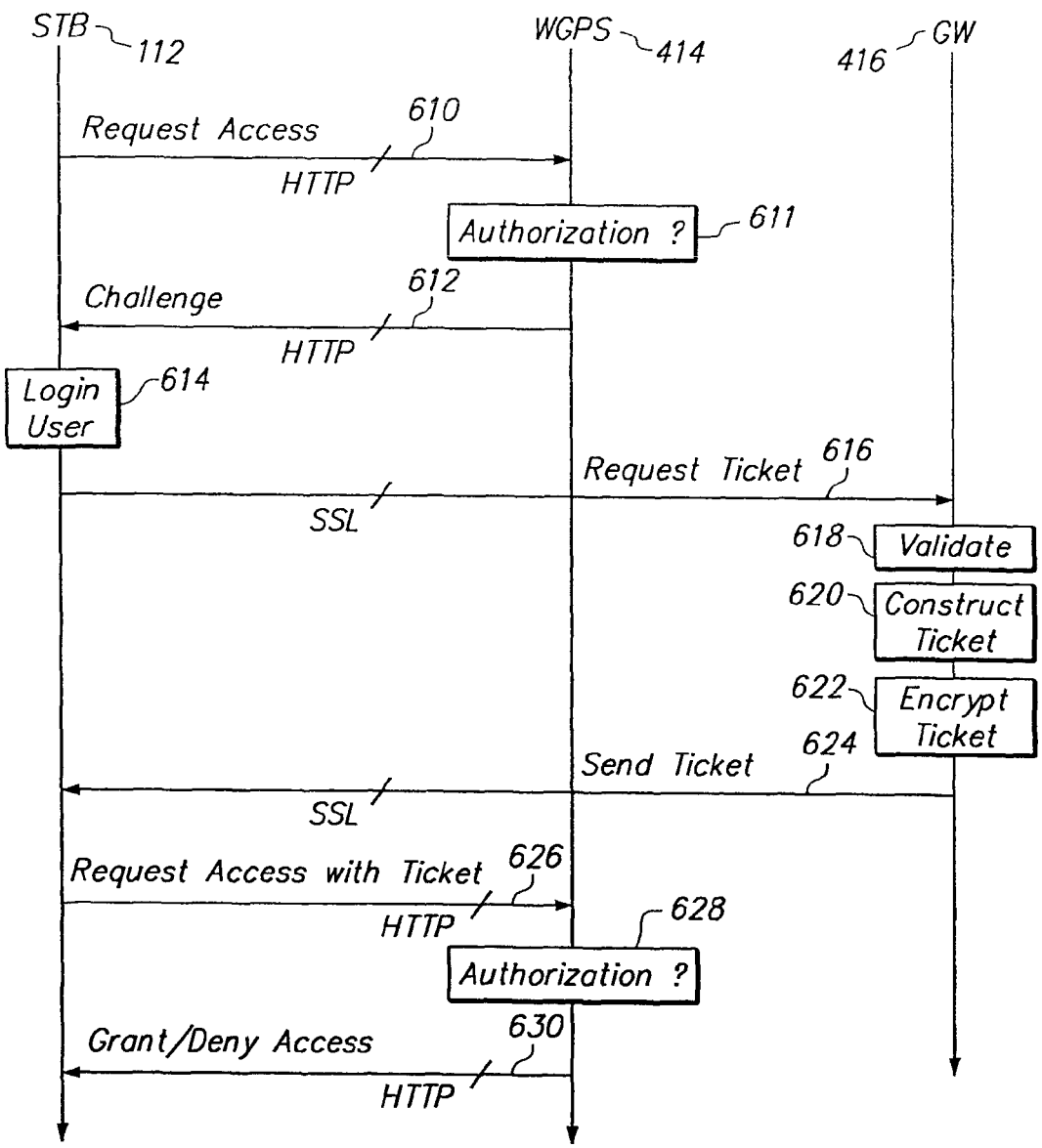
FIG. 6 is a flow diagram illustrating transactions among the client, WGPS, GS, and keymaster according to a preferred embodiment of the present invention.
Figure 7:
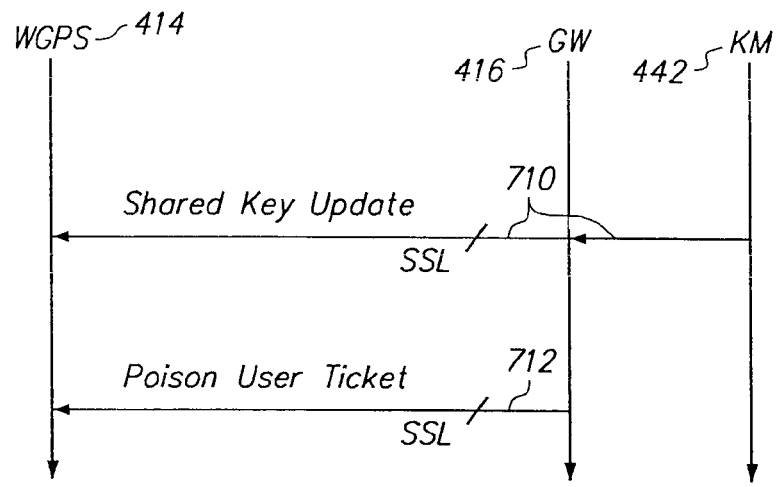
FIG. 7 is a flow diagram illustrating transactions between the WGPS, GS, and keymaster that may occur independently of the transactions of FIG. 6.

FIG. 6 is a flow diagram illustrating transactions among the client 112, WGPS 414, GS 416, and keymaster 442 according to a preferred embodiment of the present invention. The illustrated transaction sequence represents only one of many possible sequences of transactions. In FIG. 6, a horizontal arrow represents a transaction where the primary flow of information is in the direction of the arrow. The slash across the transaction illustrates the protocol used to transmit the data, typically either HTTP or the SSL. In addition, FIG. 7 is a flow diagram illustrating transactions between the WGPS 414, GS 416, and keymaster 442 that may occur independently of the transactions of FIG. 6.

Initially, the user uses the UI on the client 112 to request 610 access to a service in the walled garden 420. For example, the client 112 may generate a UI on the TV 110. The user, using the UI and an input device such as an IR keyboard, requests access to the service through the web browsing software 324 executing on the client 112. Alternatively, the client 112 may be coupled to or integrated into a computer system and the user may use web browsing software to request access to a web site in the walled garden 420. As mentioned above, the request 610 from the client 112 to the WGPS 414 preferably takes the form of a URL such as "http://wg/<plot_number>/ . . . " In one embodiment, the user visits a web page or portal that references, either directly or indirectly, all of the available walled garden services. When the user selects a link to a particular service, the web page directs the client 112 to the proper URL.

The WGPS 414 receives the request 610 and determines from the URL that the client is attempting to access a restricted service in the walled garden 420. Assume, however, that this request 610 is the first request from the client 112 to the WGPS 414. As a result, the client 112 did not include a ticket with the request 610. Therefore, the WGPS 414 denies 611 access to the walled garden 420 and sends a HTTP 407 response to challenge 612 the client 112 to supply the ticket in a subsequent request.

The client 112 receives the challenge 612. Preferably, the web browser then passes control to an authorization dynamic link library (DLL) executing on the client 112. The authorization DLL creates the appropriate UI to let the user authenticate himself or herself to the client 112.

The authorization DLL then establishes a SSL connection with the GS 416 and makes a request 616 for the ticket by sending the user authentication information, as well as the Box ID of the client 112, across the SSL connection. The GS 416 authenticates the user by validating 618 the authentication information against the information in the database 440.

Figure 8:
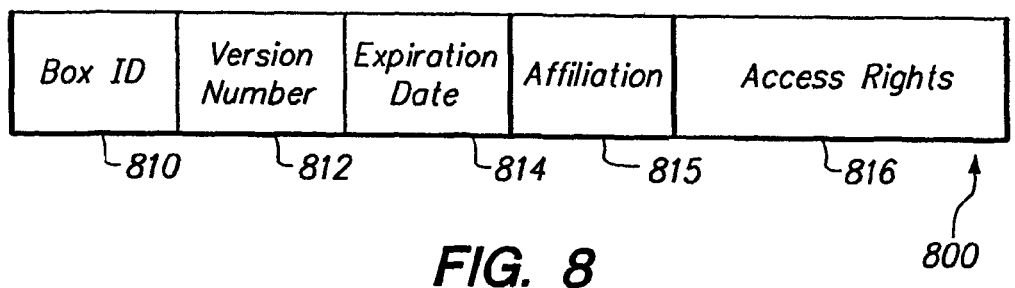
FIG. 8 illustrates the fields in a ticket according to an embodiment of the present invention.

If the validation 618 is successful, the GS 416 preferably constructs 620 the ticket. As shown in FIG. 8, the ticket 800 preferably includes the Box ID 810 of the client 112 requesting the ticket, a version number 812, an expiration date 814 (or duration when the ticket is valid), an affiliation 815, and a set of bits representing the access rights of the user 816. The version number 812 is preferably a control number used by the GS 416 to ensure that the WGPS 414 properly interprets the ticket 800. The expiration date 814 can be any time in the future or a time span when the ticket 800 is valid and may range, for example, from a few minutes to a few hours. The affiliation indicates the particular walled garden 420 or MSO to which the ticket 800 pertains. The set of bits representing the access rights of the user 816 are preferably organized such that certain bits correspond to certain servers, sites, or services within the walled garden 420. In one embodiment of the present invention, the bits representing the access rights 816 are run length encoded (RLE) to reduce the storage size of the field. Other information, such as the IP address of the client 112 and a timestamp may also be stored in the ticket 800.

As shown in FIG. 7, the keymaster 442 occasionally shares 710 a secret key with the GS 416 and the WGPS 414 via an SSL connection. Returning to FIG. 6, the GS 416 preferably uses a symmetric encryption technique to encrypt 622 the ticket 800, T, with the shared secret key to produce an encrypted ticket, T'. In an alternative embodiment, the GS 416 encrypts only the portion of the ticket containing the bits representing the user access rights 816. The WGPS 414 uses the decryption key, which is preferably identical to the encryption key, to decrypt the ticket 800. In one embodiment of the present invention, this encryption is performed using the data encryption standard (DES). However, other embodiments of the present invention may use different encryption techniques, including techniques where the encryption and decryption keys differ.

The resulting encrypted ticket is passed 624 to the client 112. The client 112 preferably stores the encrypted ticket internally. Since the client 112 does not have access to the secret key shared by the keymaster 442, GS 416, and WGPS 414, the client cannot decrypt or alter the ticket.

If, for any reason, the GS 416 decides to invalidate or revoke a ticket, the GS 416 poisons the ticket by sending 712 an invalidity notice to the WGPS 414 as shown in FIG. 7. The WGPS 414 treats a request to access the walled garden 420 made by a client with a poisoned ticket as if no ticket had been included.

Returning to FIG. 6, the client 112 again sends a HTTP request to the WGPS 414 requesting access to a service in the walled garden 420. This time, however, the client 112 includes the encrypted ticket with the HTTP request in an "Authorization" header. The WGPS 414 receives the ticket with the request and determines 628 whether the ticket grants the user access to the walled garden 420 and walled garden service. To make this determination, the WGPS 414 uses the timestamp to determine the secret key used to encrypt the ticket. Then, the WGPS 414 uses the secret key to decrypt the ticket. Next, the WGPS 414 compares the Box ID in the ticket with the Box ID of the requesting client to ensure that the ticket was received from the correct client 112. The WGPS 414 also checks the expiration date in the ticket to ensure that the ticket is still valid and compares the ticket with the information in its database 415 to ensure that the ticket has not been poisoned.

If the above tests are satisfied, then the WGPS 414 examines the affiliation 815 and the set of bits representing the access rights of the user 816 to determine whether the user has rights to the specified walled garden 420 service. To make the latter determination, the WGPS 414 extracts the plot number from the HTTP request and uses it as an index into the set of bits 816 in the ticket 800. Preferably, the value of the indexed bit specifies whether the user is authorized to access the walled garden 420 service or site having the given plot number. This embodiment is preferred because it minimizes the overhead utilized to determine whether the ticket allows access. Of course, alternative embodiments of the present invention may use different techniques to encode the user access rights in the ticket.

The WGPS 414 then either grants or denies 630 access to the user. If the WGPS 414 grants access, then it allows the user request 626 to reach the walled garden 420 service having the specified plot number. Accordingly, the specified URL from the walled garden server will be served to the client 112. In this case, the client 112 downloads and executes the JAVA, HTML, XML, and/or JAVASCRIPT code providing the service as described below. Preferably, the downloaded code is not persistently stored in the client 112. If the WGPS 414 denies access, then it sends a HTTP status 407 response to the client 112 with an HTTP header indicating the reason for denying access. Typically, the client 112 will respond to this denial by requesting 616 a new ticket from the PS 438.

Figure 9:
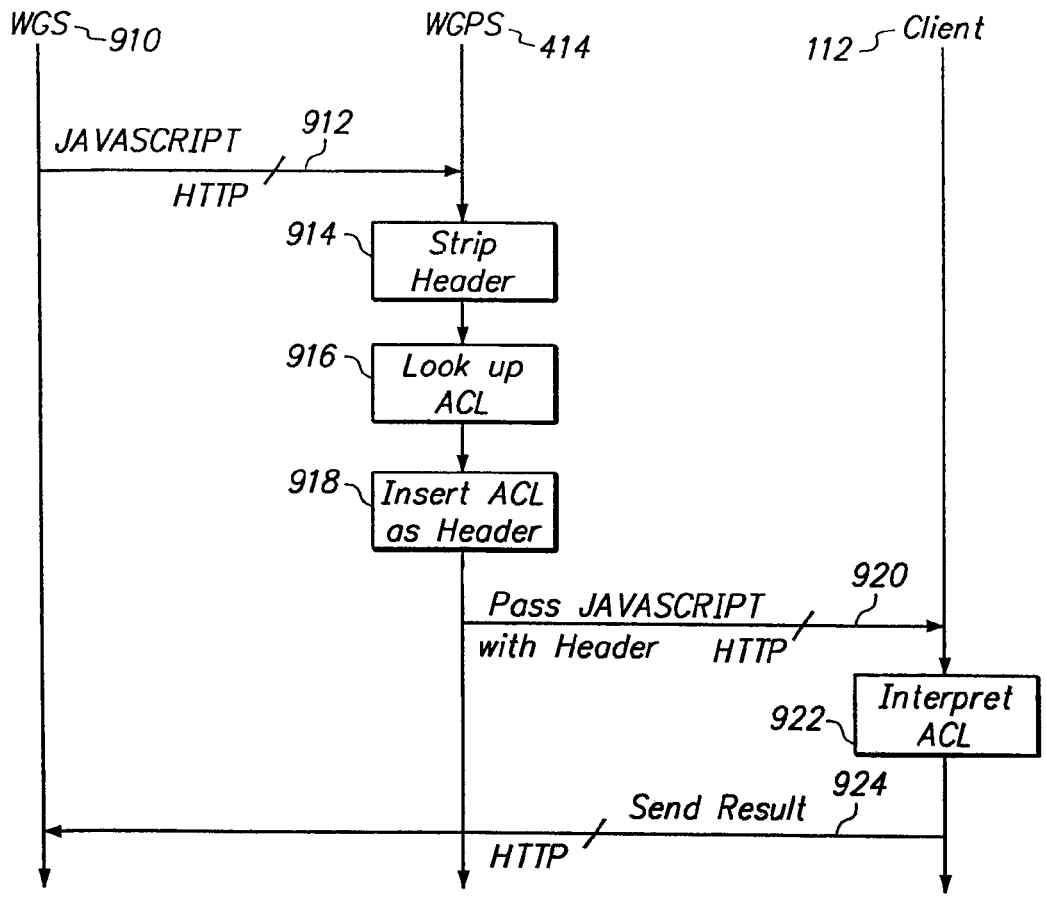
FIG. 9 is a flow diagram illustrating transactions among a walled garden site, the WGPS, and the client according to a preferred embodiment of the present invention.

FIG. 9 is a flow diagram illustrating transactions among a Walled Garden Server (WGS) 910, the WGPS 414, and the client 112 according to a preferred embodiment of the present invention when the WGS responses to an client request for a service. The WGS 910, which may be any of the server types described above, sends 912 a message to the client 112 via HTTP. The message contains code in JAVASCRIPT invoking one or more of the functions in the APIs implemented in the shell 326 of the client 112. Other embodiments of the present invention may use languages other than JAVASCRIPT or other invocation methods, such as MACROMEDIA FLASH, to call API functions.

The message from the WGS 910 to the client 112 necessarily passes through the WGPS 414. Preferably, a proxy plug-in on the WGPS 414 traps all messages from WGS' to clients in order to attach an ACL to each message. When the WGPS 414 traps a message, it examines 914 the header provided by the WGS 910 for any potential security violations. For example, the WGPS 414 strips any improper headers off the message to protect against masquerading or spoofing by the WGS 910. Then, the WGPS 414 looks up 916 the corresponding entry in the Walled Garden Permissions Table stored in the database 415 and retrieves the ACL for the given service, affiliation, and user agent. The WGPS 414 inserts 918 the ACL into the message from the WGS 910 to the client 112 as an HTTP header. In one embodiment of the present invention, the ACL is inserted into a "athmAPIAuth" header, although other headers or transport mechanisms can be used as well.

In addition, the WGPS 414 can place information in the header that further limits the permissions contained in the ACL. For example, the WGPS 414 can restrict the WGS 910 to accessing channel guide data for the current time only, for the next hour, for the next day or week, etc. Similarly, the WGPS 414 can restrict the WGS 910 to accessing channel guide data for only a certain channel or network. The WGPS 414 preferably implements these additional limitations by placing additional fields in the HTTP header. After the headers are inserted, the WGPS 414 passes 920 the message to the client 112.

The shell 326 executing on the client 112 extracts the ACL, affiliations, and any other permissions from the headers and determines 922 whether the data grant the WGS 910 access to the API functions called by the attendant code. The shell 326 codifies the mapping from bit positions in the ACL to API functions and enforces the access control. If the ACL does not allow a called API function to be executed, then the shell 326 preferably returns 924 the FAIL_FUNCTION_NOT_AUTHORIZED message to the application or program that invoked the API function. Otherwise, the shell 326 returns 924 the result of the function invocation.

In summary, the present invention is an authentication and authorization method and system that lets individual users access one or more of the services within the walled garden 420. The client 112 authentication procedure allows individual users to be authenticated. In addition, the GS 416, PS 438, and associated database 440 can authorize a unique set of access rights for each user. The WGPS 414 ensures that only authenticated and authorized users are allowed to access servers within the walled garden 420. Moreover, the design of the system, including the ticket and shared secret key, provides an efficient implementation, thereby keeping a relatively light processing load on the GS 416 and PS 438.

In addition, the present invention enhances the services provided by the walled garden 420 by allowing WGS' to access the APIs of the clients. The Walled Garden Permissions table stored in the database 415 of the WGPS 414 allows the access rights of a WGS to be controlled with a fine degree of granularity with respect to functions, time, and channels/networks.

By using the method and system described herein, a service provider or other entity can sell subscriptions or other forms of access rights to one or more services within the walled garden 420. For example, an ISP can sell subscriptions to tiers of services, much like subscriptions to tiers of television channels are sold. In addition, the ISP can sell the right to access the client 112 APIs to the operators of the WGS'.

APPENDIX

Channel Navigation

Channel Up

Syntax

[Status]=TV.ChannelUp( )

Parameters

Status

The return status value from the ChannelUp method. The return status value will be one of the following:

SUCCESS—The tune completed successfully

FAIL_INVALID_CHANNEL—The tune failed because of an invalid channel number

FAIL_PARENTAL_CONTROL—The tune failed because of parental control and a valid Parental Control PIN was not entered FAIL_CHANNEL_NOT_AUTHORIZED—The tune failed because the channel was not authorized by the CA system FAIL_FUNCTION_NOT_AUTHORIZED—The tune failed because the function_invocation was not authorized by the CA system FAIL_NOT_PURCHASED—The tune failed because the channel carried an IPPV event and it was not purchased Channel Down Syntax

[Staus]=TV.ChannelDown( )

Parameters

Status

The return status value will be one of the following:

SUCCESS—The tune completed successfully

FAIL_INVALID_CHANNEL—The tune failed because of an invalid channel number

FAIL_PARENTAL_CONTROL—The tune failed because of parental control and a valid Parental Control PIN was not entered FAIL_CHANNEL_NOT_AUTHORIZED—The tune failed because the channel was not authorized by the CA system FAIL_FUNCTION_NOT_AUTHORIZED—The tune failed because the function_invocation was not authorized by the CA system FAIL_NOT_PURCHASED—The tune failed because the channel carried an IPPV event and it was not purchased Direct Channel Specification Syntax

[Status]=TV.TuneChannel(Channel)

Parameters

Channel
   A numeric value that specifies the channel number.

Status
   The return status value will be one of the following:
      SUCCESS—The tune completed successfully
      FAIL_INVALID_CHANNEL—The tune failed because of an invalid channel number
      FAIL_PARENTAL_CONTROL—The tune failed because of parental control and a valid Parental Control PIN was not entered
      FAIL_CHANNEL_NOT_AUTHORIZED—The tune failed because the channel was not authorized by the CA system
      FAIL_FUNCTION_NOT_AUTHORIZED—The tune failed because the function invocation was not authorized by the CA system
      FAIL_NOT_PURCHASED—The tune failed because the channel carried an IPPV event and it was not purchased Remark The TuneChannel method tunes to the specified channel number.

Get Current Channel

Syntax

[Status]=TV.GetCurrentChannel(Channel)

Parameters

Channel
   A numeric value that returns the current channel number.

Status
   The return status value from the TuneChannel method. The return status value will be one of the following:
      SUCCESS—The function completed successfully
      FAIL_INVALID_CHANNEL—The tune failed because of an invalid channel number Channel Map Access Channel map access allows applications to inquiry about the details of the channel line-up (aka channel map) currently available in the set-top. Access to the service information, i.e. station call letters and network identifiers are available through the channel map access.

Syntax

[Status]=ChannelMap.ChannelToNetwork (Channel, Network, Station)

Parameters

Channel
   A numeric value that specifies the channel number.

Network
   A string value that returns the broadcast network name.

Station
   A string value that returns the local station name.

Status
   The return status value will be one of the following:
      SUCCESS—The function completed successfully
      FAIL_INVALID_CHANNEL—The function failed because of an invalid channel number
      FAIL_FUNCTION_NOT_AUTHORIZED—The function failed because the function invocation was not authorized by the CA system Syntax

[Status]=ChannelMap.NetworkToChannel (Network, Channel, Station)

Parameters

Network
   A string value that specifies the broadcast network name.

Channel
   A numeric value that returns the channel number.

Station
   A string value that returns the local station name.

Status
   The return status value from the NetworkToChannel method. The return status value will be one of the following:
      SUCCESS—The function completed successfully
      FAIL_INVALID_CHANNEL—The function failed because of an invalid channel number
      FAIL_FUNCTION NOT_AUTHORIZED—The function failed because the function invocation was not authorized by the CA system Remark The NetworkToChannel method returns the channel number and station name for the specified network name. If there are more than one channel that carries the specified network name, only the first channel map entry is returned.

Syntax

[Status]=ChannelMap.ChannelRange (MinChannel, MaxChannel)

Parameters

MinChannel
   A numeric value that returns the minimum channel number.

MaxChannel
   A numeric value that returns the maximum channel number.

Status
   The return status value from the ChannelRange method. The return status value will be one of the following:
      SUCCESS—The function completed successfully
      FAIL_FUNCTION_NOT_AUTHORIZED—The function failed because the function invocation was not authorized by the CA system Remark The ChannelRange method returns the minimum and maximum channel numbers supported by the channel map provided by the cable system.

EPG Data Access

EPG Data Access allows applications to inquiry details of the program guide data. The EPG Data Access is controlled by the following attributes:

- Access to schedule information (program name, start time, end time, and rating)
- Access to editorial information (program description, etc.)
- Access to PPV information (pricing, etc.)
- Dividing up schedule information (current time, next hour, next day, etc.)
- Control access on a source by source basis (only access guide data for a particular network)

Schedule Information

Syntax

[Status]=EPG.GetScheduleInfo (Channel, Relative Time, ProgramName, StartTime, EndTime, Rating)

Parameters

Channel
    A numeric value that specifies the channel number for which schedule information is requested Relative Time
    A numeric value that specifies the relative time in minutes from the current time for which schedule information is requested ProgramName
    A string value that returns the program name of the program that occurs on the specified channel at the specified relative time.

StartTime
    A numeric value that returns the start time of the program that occurs on the specified channel at the specified relative time.

EndTime
    A numeric value that returns the end time of the program that occurs on the specified channel at the specified relative time.

Status
    The return status value will be one of the following:
    SUCCESS—The function completed successfully
    FAIL_FUNCTION_NOT_AUTHORIZED—The function failed because the function invocation was not authorized by the CA system
    FAIL_TIME_NOT_AUTHORIZED—The function failed because access to schedule information at the specified relative time was not authorized by the CA system
    FAIL_CHANNEL_NOT_AUTHORIZED—The function failed because access to schedule information on the specified channel was not authorized by the CA system Remark The GetScheduleInfo method returns the program name, start time, end time, and rating of the program that is on the specified channel at the specified relative time.

Program Information

Syntax

[Status]=EPG.GetProgramInfo (Channel, Relative Time, ProgramDescription)

Parameters

Channel
    A numeric value that specifies the channel number for which schedule information is requested Relative Time
    A numeric value that specifies the relative time in minutes from the current time for which schedule information is requested ProgramDescription
    A string value that returns the detailed program description of the program that occurs on the specified channel at the specified relative time.

Status
    The return status value from the GetProgramInfo method. The return status value will be one of the following:
    SUCCESS—The function completed successfully
    FAIL_FUNCTION_NOT_AUTHORIZED—The function failed because the function invocation was not authorized by the CA system
    FAIL_TIME_NOT_AUTHORIZED—The function failed because access to schedule information at the specified relative time was not authorized by the CA system
    FAIL_CHANNEL_NOT_AUTHORIZED—The function failed because access to schedule information on the specified channel was not authorized by the CA system Remark The GetProgramInfo method returns the detailed program description of the program that is on the specified channel at the specified relative time.

Pay-Per-View Information

Syntax

[Status]=EPG.GetPPVInfo(Channel, RelativeTime, ISPPV, Price)

Parameters

Channel
    A numeric value that specifies the channel number for which schedule information is requested Relative Time
    A numeric value that specifies the relative time in minutes from the current time for which schedule information is requested IsPPV
    A boolean value that indicates if specified program that occurs on the specified channel at the specified relative time is a PPV event. A value of TRUE indicates that it is a PPV event, a value of FALSE indicates that it is not a PPV event.

Price
    A string value that returns the price of the PPV event that occurs on the specified channel at the specified relative time. A value of NULL is returned if the specified program is not a PPV event.

Status
    The return status value from the GetScheduleInfo method. The return status value will be one of the following:

SUCCESS—The function completed successfully
FAIL_FUNCTION_NOT_AUTHORIZED—The function failed because the function invocation was not authorized by the CA system
FAIL_TIME_NOT_AUTHORIZED—The function failed because access to schedule information at the specified relative time was not authorized by the CA system
FAIL_CHANNEL_NOT_AUTHORIZED—The function failed because access to schedule information on the specified channel was not authorized by the CA system Remark The GetPPVInfo method returns the PPV status and price of the program that is on the specified channel at the specified relative time.

Instantiation Of Standard UI Elements

The Channel Banner

Syntax

[Status]=UI.DisplayChannelBanner( )

Parameters

Status
  The return status value will be one of the following:
  SUCCESS—The function completed successfully
  FAIL_FUNCTION_NOT_AUTHORIZED—The function failed because the function invocation was not authorized by the CA system Remark The DisplayChannelBanner method causes the NavShell Foundation to display the NavShell channel banner as an overlay. The channel banner will automatically be taken down after its time-out period has been reached.

The Extras Menu

Syntax

[Status]=UI.DisplayExtrasMenu (NumberOfEntries, MenuEntries, EntrySelected)

Parameters

NumberOfEntries
  A numeric value that specifies the number of menu entries contained in the MenuEntries array MenuEntries
  An array of string values that specify the text for each of menu entries to be displayed in the Extras Menu EntrySelected
  A numeric value that returns the index of menu entry selected by the viewer from the MenuEntries array Status
  The return status value from the DisplayExtrasMenu method. The return status value will be one of the following:
  SUCCESS—The function completed successfully
  FAIL_FUNCTION_NOT_AUTHORIZED—The function failed because the function invocation was not authorized by the CA system
  FAIL_VIEWER_EXIT—The function failed because the viewer pressed the EXIT key
  FAIL_DIALOG_TIMEOUT—The function failed because the time-out period for the viewer identification dialog box expires before the viewer makes a selection Remark The DisplayExtrasMenu method causes the NavShell Foundation to display the NavShell extras menu as an overlay. The viewer may then select among the entries specified by the MenuEntries array. When the viewer selects one of the menu entries, the corresponding index is returned. The extras menu will automatically be taken down after its time-out period has been reached.

Viewer Accounts

Number of Viewer Accounts

Syntax

[Status]=GetNumberOfViewers (NumberOfViewers)

Parameters

NumberOfViewers
  A numeric value that returns the number of viewer accounts that have been defined for the household.

Status
  The return status value will be one of the following:
    SUCCESS—The function completed successfully
    FAIL_FUNCTION_NOT_AUTHORIZED—The function failed because the function invocation was not authorized by the CA system Remark The GetNumberOfViewers method returns the number of viewer accounts defined for the set-top household. A return value of one indicates that only the Default_Viewer is defined for the household.

Viewer Names

Syntax

[Status]=GetViewerName (ViewerNumber, ViewerName)

Parameters

ViewerNumber
  A numeric value that specifies which viewer name is being requested. This value must be in the range 1 to the value returned by GetNumberOfViewers inclusive.

ViewerName
  A string value that returns the name for the specified viewer.

Status
  The return status value from the GetViewerName method. The return status value will be one of the following:
    SUCCESS—The function completed successfully
    FAIL_FUNCTION_NOT_AUTHORIZED—The function failed because the function invocation was not authorized by the CA system
    FAIL_INDEX_NOT_VALID—The function failed because specified ViewerNumber was outside the valid range Remark The GetViewerName method returns the viewer name for the specified viewer.

Viewer Privileges

Syntax

[Status]=GetViewerPrivileges (ViewerNumber, TVAccess, WebAccess, IPPVEnabled,

EmailEnabled, WalletEnabled)

Parameters

ViewerNumber
  A numeric value that specifies which viewer name is being requested. This value must be in the range 1 to the value returned by GetNumberOfViewers inclusive.

TVAccess
  A boolean value that returns whether the specified viewer's TV viewing access is restricted WebAccess
  A boolean value that returns whether the specified viewer's Web browsing access is restricted Status
  The return status value from the GetViewerPrivileges method. The return status value will be one of the following:
    SUCCESS—The function completed successfully
    FAIL_FUNCTION_NOT_AUTHORIZED—The function failed because the function invocation was not authorized by the CA system
    FAIL_INDEX_NOT_VALID—The function failed because specified ViewerNumber was outside the valid range Remark The GetViewerPrivileges method returns the viewer privileges for the specified viewer.

Viewer Parental Controls

Syntax

[Status]=GetViewerParentalControls (ViewerNumber, TVRating, MovieRating, WebAccess, EmailAccess)

Parameters

ViewerNumber
  A numeric value that specifies which viewer name is being requested. This value must be in the range 1 to the value returned by GetNumberOfViewers inclusive.

TVRating
  A string value that returns the specified viewer's TV rating parental control setting MovieRating
  A string value that returns the specified viewer's MPAA rating parental control setting Status
  The return status value from the GetViewerParentalControls method. The return status value will be one of the following:
    SUCCESS—The function completed successfully
    FAIL_FUNCTION_NOT_AUTHORIZED—The function failed because the function invocation was not authorized by the CA system
    FAIL_INDEX_NOT_VALID—The function failed because specified ViewerNumber was outside the valid range Remark The GetViewerParentalControls method returns the viewer parental control settings for the specified viewer.

Viewer Identification

Syntax

[Status]=ViewerIdentification (Message, Viewer)

Parameters

Message
  A string value that specifies the message text displayed in the viewer identification dialog box.

Viewer
  A string value that returns the viewer name entered by the viewer. The viewer name will be one of the viewer accounts associated with the household.

Status
  The return status value from the ViewerIdentification method. The return status value will be one of the following:
    SUCCESS—The function completed successfully
    FAIL_FUNCTION_NOT_AUTHORIZED—The function failed because the function invocation was not authorized by the CA system
    FAIL_INVALID_PIN—The function failed because the viewer entered an invalid PIN for the selected viewer
    FAIL_VIEWER_EXIT—The function failed because the viewer pressed the EXIT key
    FAIL_DIALOG_TIMEOUT—The function failed because the time-out period for the viewer identification dialog box expires before the viewer makes a selection Remark The ViewerIdentification method displays a viewer identification dialog box with the specified text message. The viewer then can select the desired viewer from the list of available viewers associated with the household and enter the appropriate PIN for that viewer to identify himself. The ViewerIdentification method then returns the name of the viewer selected. The viewer can also press the EXIT key to terminate the viewer identification dialog box without selecting a viewer, or they can let the dialog box time-out, or enter an invalid PIN. These conditions are returned in the Status return value. In households where only a single viewer account has been created, the viewer does not have the option of selecting among multiple viewers, but must still enter a valid PIN. The viewer name returned when the correct PIN is entered is Default_Viewer.

E-Wallet and Buy-Sequence

E-Wallet Purchase

Syntax

[Status]=EwalletPurchase (NumberOfPurchaseOptions, PurchaseOptions, SelectedOption, Buyer, Shipto)

Parameters

NumberOfPurchaseOptions
  A numeric value that specifies the number of purchase options contained in the PurchaseOptions array.

PurchaseOptions
  An array of string values that specifies the message text for each purchase option that is available in the E-wallet purchase transaction dialog box. The first entry in this array is the default option displayed.

SelectedOption
  A numeric value that returns the index of purchase option selected by the viewer from the PurchaseOptions array.

Status
  The return status value will be one of the following:
    SUCCESS—The function completed successfully
    FAIL_FUNCTION_NOT_AUTHORIZED—The function failed because the function invocation was not authorized by the CA system
    FAIL_INVALID_PIN—The function failed because the viewer entered an invalid PIN for the selected viewer
    FAIL_VIEWER_EXIT—The function failed because the viewer pressed the EXIT key
    FAIL_DIALOG_TIMEOUT—The function failed because the time-out period for the viewer identification dialog box expires before the viewer makes a selection Remark The EwalletPurchase method displays an E-Wallet purchase transaction dialog box with the specified array of purchase options. The viewer then can select the desired purchase option from the list of available purchase options. The EwalletPurchase method then returns the index of the viewer selected purchase option, the name of the viewer that is performing the purchase, and the name of the person to which the purchase will be shipped. The viewer can also press the EXIT key to terminate the E-Wallet purchase transaction dialog box without selecting a purchase option, or they can let the dialog box time-out, or enter an invalid PIN. These conditions are returned in the Status return value. In households where only a single viewer account has been created, the viewer does not have the option of selecting among multiple viewers who is performing the purchase, but must still enter a valid PIN. The viewer name returned when the correct PIN is entered is Default_Viewer.

Reminders

Set Reminder

Syntax

[Status]=Rem.SetReminder (RelativeDay, TimeOfDay, ReminderMessage, ForUser, ReminderURL)

Parameters

RelativeDay
  A numeric value that specifies the number of days in the future at which the reminder is to be triggered.

TimeOfDay
  A numeric value that specifies the time of day on the day specified by RelativeDay at which the reminder is to be triggered.

ReminderMessage
  A string value that specifies the message text displayed in the TV Notice dialog box.

ReminderURL
  A string value that specifies the URL that is accessed when the viewer selects "Yes" in the TV Notice dialog box.

ForUser
  A string value that specifies the viewer name for whom the reminder is intended. The viewer name must be one of the viewer accounts associated with the household.

Status
  The return status value from the SetReminder method. The return status value will be one of the following:
    SUCCESS—The function completed successfully
    FAIL_FUNCTION_NOT_AUTHORIZED—The function failed because the function invocation was not authorized by the CA system
    FAIL_INVALID_VIEWER—The function failed because the specified viewer name is not a valid viewer of the household
    FAIL_REMINDER_CONFLICT—The function failed because there is an existing reminder set that conflicts with the specified time for the requested reminder.

Remark

The SetReminder method sets a reminder for the specified viewer that displays the specified reminder message when the reminder is triggered. The specified URL is displayed if the viewer elects to act on the reminder when it occurs. The reminder is displayed as a TV Notice.

Display TV Notice

This method allows the content provider to simulate a reminder by directly displaying the TV Notice dialog box immediately, rather than setting a reminder and waiting for the reminder to be triggered.

Syntax

[Status]=Rem.DisplayTVNotice (NoticeMessage, NoticeURL)

Parameters

NoticeMessage
  A string value that specifies the message text displayed in the TV Notice dialog box.

NoticeURL
  A string value that specifies the URL that is accessed when the viewer selects "Yes" in the TV Notice dialog box.

Status
  The return status value will be one of the following:
    SUCCESS—The function completed successfully
    FAIL_FUNCTION_NOT_AUTHORIZED—The function failed because the function invocation was not authorized by the CA system
    FAIL_INVALID_VIEWER—The function failed because the specified viewer name is not a valid viewer of the household Remark The SetReminder method sets a reminder for the specified viewer that displays the specified reminder message when the reminder is triggered. The specified URL is displayed if the viewer elects to act on the reminder when it occurs. The reminder is displayed as a TV Notice.

Printing

Syntax

[Status]=PrintPage ( )

Parameters

Status

The return status value from the DisplayTVNotice method. The return status value will be one of the following:
SUCCESS—The function completed successfully
FAIL_FUNCTION_NOT_AUTHORIZED—The function failed because the function invocation was not authorized by the CA system
FAIL_PRINTER_ERROR—The function failed because of an error on the printer Remark The PrintPage method prints the current page displayed on the TV.

We claim:

1. A computer program product comprising:
a non-transitory computer usable storage medium having computer executable code embodied therein for managing access to an application program interface (API) comprising a plurality of functions, the computer executable code comprising:
a first module for receiving a message containing code calling a function in the API associated with television viewing privileges and an access control list (ACL) indicating API function execution rights of an originator of the message;
a second module for determining whether the ACL indicates that the originator of the message has the right to execute the called function associated with television viewing privileges; and
a third module for sending a response to the originator of the message indicating whether the code successfully called the function in the API associated with television viewing privileges.

2. The computer program product of claim 1, wherein the ACL indicating API function execution rights comprises:
a value identifying API functions that can be executed by the originator of the message.

3. The computer program product of claim 1, wherein the ACL indicating API function execution rights comprises:
a value restricting the API functions that can be executed by the originator of the message based on time.

4. The computer program product of claim 1, wherein the function in the API is associated with pay-per-view (PPV) television viewing privileges.

5. The computer program product of claim 1, wherein the function in the API is associated with determining television viewing privileges of a particular television viewer of a plurality of television viewers.

6. A computer program product comprising:
a non-transitory computer usable storage medium having computer executable code embodied therein for passing messages from a server to a client, the computer executable code comprising:
a first module for receiving a message containing code calling a function in an API associated with television viewing privileges from the server intended for the client;
a second module for determining permissions of the server with respect to the client;
a third module for including the determined permissions with the message; and
a fourth module for passing the message and the determined permissions to the client.

7. The computer program product of claim 6, wherein the second module comprises:
a module for determining an identity of the server originating the message;
a module for determining a user agent of the client; and
a module for retrieving the permissions of the server from a permissions table using the determined identity and user agent.

8. The computer program product of claim 7, wherein the permissions table is stored in a database and the module for retrieving the permissions of the server comprises:
a module for interfacing with the database to access the permissions table.

9. The computer program product of claim 6, wherein the third module comprises:
a module for adding a hypertext transport protocol (HTTP) header specifying the determined permissions to the message.

10. The computer program product of claim 6, further comprising:
a fifth module for scanning the message from the server for potential security violations.

11. The computer program product of claim 10, further comprising:
a sixth module for removing headers identified as potential security violations from the message.

12. A system for managing access to an application program interface (API) comprising a plurality of functions, comprising:
a processor for executing computer program code;
a non-transitory computer-readable storage medium storing executable computer program code comprising:
a first module for receiving a message containing code calling a function in the API associated with television viewing privileges and an access control list (ACL) indicating API function execution rights of an originator of the message;
a second module for determining whether the ACL indicates that the originator of the message has the right to execute the called function associated with television viewing privileges; and
a third module for sending a response to the originator of the message indicating whether the code successfully called the function in the API associated with television viewing privileges.

13. The system of claim 12, wherein the ACL indicating API function execution rights comprises:
a value identifying API functions that can be executed by the originator of the message.

14. The system of claim 12, wherein the ACL indicating API function execution rights comprises:
a value restricting the API functions that can be executed by the originator of the message based on time.

15. The system of claim 12, wherein the function in the API is associated with pay-per-view (PPV) television viewing privileges.

16. The system of claim 12, wherein the function in the API is associated with determining television viewing privileges of a particular television viewer of a plurality of television viewers.

* * * * *